W. C. LEA.
CLOTHES LINE CLAMP.
APPLICATION FILED JUNE 30, 1909. RENEWED APR. 19, 1911.
1,000,927.
Patented Aug. 15, 1911.
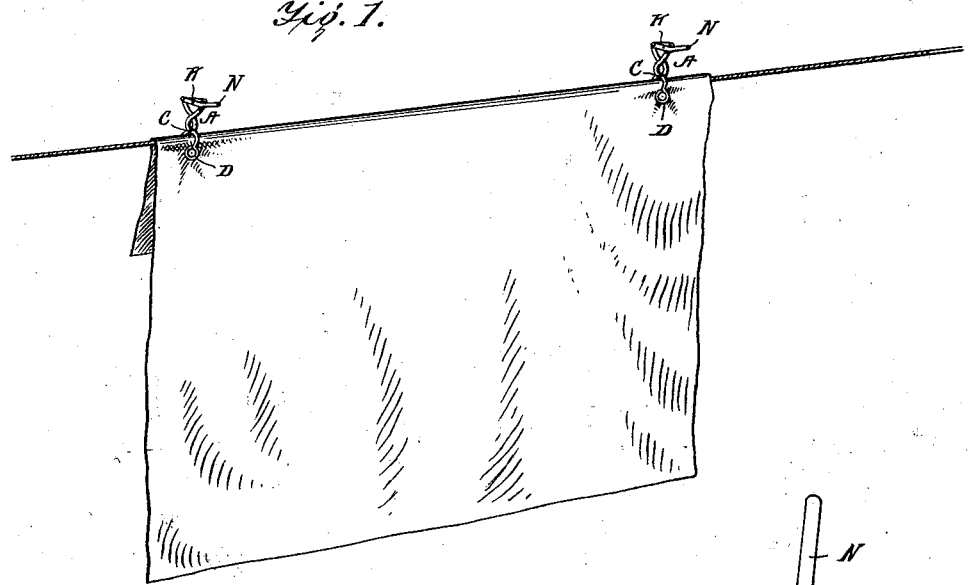
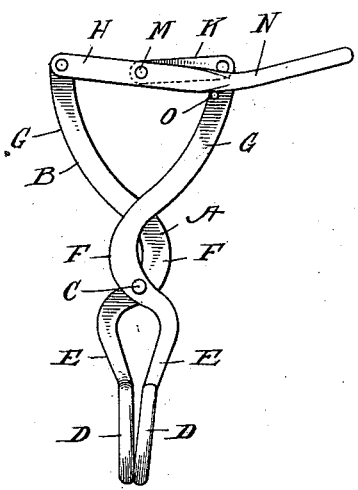
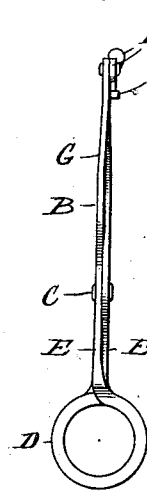
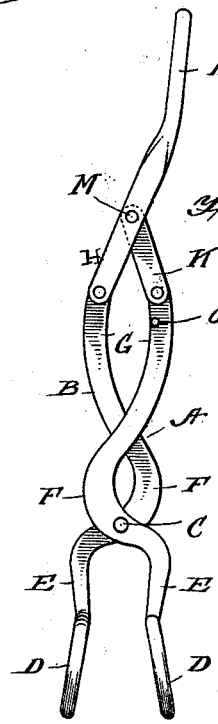
WITNESSES
INVENTOR
WILLIAM C. LEA,
BY
ATTORNEYS

UNITED STATES PATENT OFFICE.

WILLIAM C. LEA, OF CHICKASHA, OKLAHOMA.

CLOTHES-LINE CLAMP.

1,000,927. Specification of Letters Patent. Patented Aug. 15, 1911.

Application filed June 30, 1909, Serial No. 505,223. Renewed April 19, 1911. Serial No. 622,134.

*To all whom it may concern:*

Be it known that I, WILLIAM C. LEA, a citizen of the United States, and a resident of Chickasha, in the county of Grady, State of Oklahoma, have invented certain new and useful Improvements in Clothes-Line Clamps, of which the following is a specification.

My invention is an improvement in clothes line clamps, and consists in certain novel constructions and combinations of parts hereinafter described and claimed.

The object of the invention is to provide a device of the class described which may be easily placed and removed, and which may be locked on the line with or without clothes thereon, and which may be easily and cheaply constructed.

Referring to the drawings forming a part hereof: Figure 1 is a perspective view of the device in use; Fig. 2 is a front view of the device in closed position; Fig. 3 is a side view; and Fig. 4 is a front view of the same opened.

The present embodiment of the invention comprises a pair of arms A and B, which are arranged in crossed relation and pivoted together, as at C, and each arm is provided at one end with a ring-shaped gripping jaw D. Each of the jaws is formed of a single piece of resilient wire or other suitable material, which is bent upon itself to form the jaw D and a shank E, the shanks diverging from each other somewhat from the jaws toward the pivot C and then converging and crossing each other. On the opposite side of the pivot from the jaw each arm is curved, as at F, the arms again crossing, and diverging from each other, as at G, and to the opposite end of each arm from the handle a link H, K is pivoted. The links H and K are pivoted together, as at M, and the link H is extended beyond the pivot and formed into a handle N.

In operation, the clamp is placed astride of the line with the clothes thereon and with the handle in the position shown in Fig. 4, the jaws being open when the handle is in such position. The handle is now turned down into the position shown in Fig. 2 until it engages and rests upon a pin O, in which position the handle is below a straight line connecting the pivots of the links and arms with each other. The jaws are now firmly clamped upon the clothes below the line, the line being received in the space between the shanks, and any force which tends to separate the jaws tends to force the handle still more closely against the stop pin. To release the clamp it is only necessary to lift the handle N, and the act of lifting the handle also separates the jaws.

It will be evident from the description that the means for locking the jaws and unlocking them is also the means for closing and unclosing them.

When not in use the clamp may be clamped on the line or may be removed, if desired. When clamped on the line, the clamp is retained firmly in position and cannot become loose.

It will be observed that each of the arms is provided with a curved portion at approximately its center, and that the arms are arranged in crossed relation with the curved portions overlapping and extending in opposite directions, and that the pivot is at one end of the overlapping portion. The connection between the ends of the arms opposite to the gripping jaws is a species of toggle joint and operates as such, the stop pin acting to limit the movement of the joint.

I claim:

A device of the class described comprising a pair of arms pivoted together and having opposing jaws at one end, the arms being pivoted together and having on the sides of the pivot opposite the jaws deflected portions whereby the free extremities of the arms opposite the jaws are brought on the same side of the device as their respective jaws whereby the forcing of the arms apart at said ends will adjust the jaws together, a lever pivoted at one end to one of said arms at their ends opposite the jaws, a link pivoted to the corresponding end of the other arm and also pivoted to the lever whereby the link and lever may be moved up and down to spread and close the jaws and a pin on one of the arms and forming a stop for the lever when the latter is adjusted to close the jaws of the device substantially as set forth.

WILLIAM C. LEA.

Witnesses:
C. M. DAVIS,
F. R. HARRISON.

Copies of this patent may be obtained for five cents each, by addressing the "Commissioner of Patents, Washington, D. C."